United States Patent Office 2,941,881
Patented June 21, 1960

2,941,881

PROCESS OF DRYING AND SINTERING ORES

Hans Rausch, Oberursel (Taunus), and Kurt Meyer and Karl-Hubert Lintermanns, Frankfurt am Main, Germany, assignors to Metallgesellschaft Aktiengesellschaft, Frankfurt am Main, Germany No Drawing. Filed Mar. 21, 1958, Ser. No. 722,854

6 Claims. (Cl. 75—5)

This invention relates to the preparation of raw ores and in particular to the drying of wet ores on a sintering bed.

To prepare ores for a blast furnace, it is customary to agglomerate fine and fragile ore particles on a sintering bed. It is also known to form a sinter bed in two layers in order to increase the thermal efficiency of the roasting of the ores. The lower layer is primarily composed of the raw ore which is easily screened to sinterable particle size and which becomes dried and heat hardened, but not sintered, in the bed. The upper layer is composed of a mixture of raw ore as in the lower layer and recycled material which has not been previously sintered.

The recycled material added to the upper layer comes from the material which has been dried and heat hardened in a previous treatment from a lower layer, and can include fines which are separated out from the material sintered in the upper layer and recycled.

However, some ores exist which are too plastic and sticky to charge directly to a blast furnace without giving them preliminary treatment.

Usually such plastic and sticky ores are first treated by being first dried to a water content of from about 8 to 9 percent before the sinter bed is formed, and then screened. The fine particles of less than 8 mm. are then pelletized and/or sintered into larger particles. The coarse particles from the screen are directly charged into a blast furnace. Nevertheless, some types of ores exist which have such an amount of water of hydration and carbonic acid and/or are of so fragile a structure that these screened out coarse particles must be heat hardened or sintered before being charged to a blast furnace.

The preparation of wet and unscreenable ores according to prior two layer sinter bed processes would be to first dry the ores in a separate apparatus and then sintering the fines in the lower layer of a sinter bed, with the upper layer of the sinter bed formed by the coarser particles together with recycled material from the lower layer.

A sintering apparatus often has to process mixtures of various ores rather than a single ore, with the separate ores having different screenability, moisture content, temperature requirements, and hardness. Consequently, for processing mixtures of wet ores, the prior art procedure would be to place the fines from the pre-dried and screened ore having the highest heat loss into the lower layer of the sinter bed, and there to heat harden it for use as a recycled material to be later mixed with the material of the upper layer. Such a process has been tried but, in addition to the sinter bed apparatus, a screen is necessary for sieving the material to be recycled, and also a separate drying apparatus is needed for ores which cannot be screened with the ordinary sieve for a two layer sinter apparatus and must be screened so that the larger ore pieces which cannot be charged directly to a blast furnace, or which are too fragile to remain unbroken, can be processed in the sintering apparatus after screening. In such process, the output of an ordinary sintering apparatus is about 28 tons/m.$^2$ per day. The sinter bed material composed of the dried mixture of ores capable of being screened, requires about 7 percent of ground coke (heat loss plus moisture content equals 23 percent). About 560 heat units per kg. of sinter is consumed for heat. This amount does not include the heat required for the preliminary drying of the ores so that they can be screened.

The objects of this invention are to produce a process so that the moist and sticky ores incapable of being screened are used in the sintering process without preliminary drying and generally without previous screening.

In general, these and other objects are obtained as follows. Raw ores having such a large range of particle size so that some of the particles are greater than 50 mm. have to be screened to separate the fines before being placed in a sintering apparatus. The screened out large particles are rough cut into smaller particles. Even though these large coarse particles have a high water content, their screening and rough cutting into smaller particles can be accomplished without difficulty. The lower layer of the sinter bed is then prepared with the raw cut up coarse particles while the upper layer is composed of the screened out fines of the raw material which were screened without previous drying and are mixed with recycled material. Such recycled material is obtained from the fines resulting from a previous lower layer operation and, if necessary, from a relatively small quantity of fine particles from a previous upper layer operation.

This process of preparing the raw ores produces a good recycling material from the fine particles in the lower layer. Also from the lower layer, the larger coarser particles, although they are not heated to a sintered temperature, become sufficiently hard and solid so that they can be mixed with the sintered products produced and charged directly into a blast furnace. Therefore, it is not necessary to give such coarse particles a high temperature treatment such as exists in the upper layer. In some cases, these coarse particles which are only treated in the lower layer have a better porosity and reductability than the actually sintered materials, and they are strong and solid enough to exist as pieces of the sintered material. Should it turn out that their solidity is not sufficient for charging a blast furnace, they can then be used as a recycled material after being broken into smaller pieces and then treated in the upper layer of the sintering process.

In extreme cases, if the raw ore is so sticky that it cannot be used for the lower layer, the ore can be opened and rendered sufficiently permeable by mixing therewith about from 10 to 18 percent of recycled material, and the use of a pre-drying plant is thus avoided.

An ordinary sintering apparatus performing this process has an output of about 26 tons/m.$^2$ per day of the same iron ore mixture as described in the heretofore typical case. Although the output is smaller, nevertheless the additional pre-drying apparatus is not necessary. The undried wet raw ore is mixed with 7 percent of coke for fuel and the heat consumption is 580 heat units per kg. of sinter, but this does not include the heat being used for the drying of the lower layer. If the proportion of large coarse pieces in the raw ore mixture is increased, the output can be raised to at least 28 tons/m.$^2$ per day.

The invention is not limited to the preparation of a mixture of raw ores. With ores that are so wet and sticky that they cannot be screened until being dried, it is possible according to a modification of this invention to prepare these ores without a preliminary drying or by eliminating a large part of the preliminary drying. In such case, the proportion of the recycled material in the upper layer is increased in accordance with the quantity of raw ore which cannot be screened so that the upper layer becomes composed eventually substantially exclusively of material recycled from the lower layer. In this manner, at least 60 percent of the preliminary drying of the raw ore is saved even under unfavorable circumstances.

The process of this invention is advantageously used with the so-called mixed fuel sintering process, that is for the use of both solid and gaseous fuels for sintering, inasmuch as the heat which is carried from the upper layer by the gases and has lost the most valuable part of its heat content, can be used in the lower layer for a high drying efficiency. Accordingly, prior processes requiring solid fuel can be replaced by the use of hot gases with a good efficiency and output.

The invention is further described in the following comparative examples:

EXAMPLE 1

*Process according to prior art*

This example includes the screening of the fines from a part of the raw ore. The raw ore mixture was composed as follows:

|  | Percent |
|---|---|
| Brown ores from mine "Sulzbach" specified in the following as Ore A | 68.8 |
| White ores from mine "Auerbach" specified in the following as Ore B | 14.7 |
| Brown ores from mine "Auerbach" specified in the following as Ore C | 16.5 |

This ore mixture had the following grain sizes:

ORE B
- 30–100 mm.=15.7%
- 20– 30 mm.= 8.0%
- 15– 20 mm.= 7.2%
- 10– 15 mm.=14.8%
- 0– 10 mm.=54.3%

ORE A
- 30–150 mm.=37.5%
- 20– 30 mm.=11.0%
- 15– 20 mm.= 6.0%
- 10– 15 mm.=14.3%
- 0– 10 mm.=31.2%

ORE C DRY
- 30–150 mm.=16.1%
- 20– 30 mm.=10.4%
- 15– 20 mm.= 4.4%
- 10– 15 mm.=11.8%
- 0– 10 mm.=57.3%

The chemical analysis of each of the three ores was as follows:

|  | Ore A, percent | Ore B, percent | Ore C, percent |
|---|---|---|---|
| Loss by burning | 12.6 | 17.3 | 12.0 |
| Total Fe | 49.75 | 35.45 | 44.5 |
| Fe | 5.58 | 12.1 | 3.91 |
| $SiO_2$ | 10.31 | 21.51 | 16.03 |
| CaO |  | 3.03 | 0.73 |
| Moisture | 10.4 | 11.3 | 11.9 |

In general, only the fine particles under 10 mm. are used for sintering and thus the above three ores had to be screened to 10 mm. size. Ore A was easily screened. Ores B and C could not be sieved because the sieves became clogged in a very short time. Therefore, Ores B and C were dried to a 3 percent residual moisture content and then sieved to 10 mm. Following this, the ores were mixed as described above. This mixture was further prepared for the sintering bed according to the following composition:

- 50 weight portions ore mixture
- 15 weight portions return product
- 3.5 weight portions coke 0–6 mm.

The coke analysis was:

| Loss in burning | percent | 81.3 |
|---|---|---|
| Ashes | do | 18.7 |
| Upper heat value | kcal | 6405 |

The coke had the following sieve analysis:

|  | Percent |
|---|---|
| +4 mm. | 4.1 |
| +2 mm. | 23.6 |
| +1 mm. | 20.2 |
| +0.5 mm. | 12.5 |
| −0.5 mm. | 39.6 |

The ores, fuel and recycled material were rapidly mixed and water added to achieve a moisture content of approximately 13 percent. In the sintering apparatus, a grate protecting layer composed of sinter from a previous operation was applied on the grate in a layer of particles of a size from 8 to 20 mm. thick in order to protect the grate from over heating. The thickness of the entire bed, including the protective layer, was 30 cm.

The sinter bed was ignited and air drawn through the sinter bed by a suction fan producing a vacuum of 800 mm. water column as measured below the grate. The vacuum, exhaust gas temperature, and volume of exhaust gas were recorded during the sintering.

Sintering was stopped when the exhaust gas reached its highest temperature. After cooling, the sinter bed was broken into pieces and screened into fractions of greater than 20 mm., 8 to 20 mm., and less than 8 mm. The particles were screened in the following amounts.

|  | Percent |
|---|---|
| >20 mm. | 59 |
| 8–20 mm. | 21.6 |
| <8 mm. | 19.4 |

The sintering time was 9 minutes 30 seconds, and the exhaust gas reached a temperature of 368° C. This corresponds with a daily output of 38.7 tons/m.$^2$ per sinter grate area. 1400 Kcal. were needed for the preliminary drying of the ores. To produce a heat of 22,000 Kcal., 3.5 kg. of coke were mixed with the ores so that a total of 23,900 Kcal. were used for sintering 50 kg. of raw ore.

EXAMPLE 2

This example is for the preparation of raw ores without sieving out the fines.

Ore A was used to form the upper layer while Ores B and C were used for forming the lower layer of the sinter bed. Consequently, Ores B and C were only screened to 30 mm. size and not to 10 mm. This eliminated the preliminary drying of Ores B and C. The lower layer was prepared to be dried and heat treated by the hot exhaust gases coming from the upper layer so that the ore of the lower layer could be easily screened following treatment. The upper layer was composed as follows:

|  | Mm. |
|---|---|
| 100 parts Ore A | 0–10 |
| 10 parts coke | 0–6 |
| 66.6 parts return material | 0–8 |

The composition of the lower layer was:

|  | Mm. |
|---|---|
| 33 parts Ore B | 0–30 |
| 36.6 parts Ore C | 0–30 |

The components of the upper and lower layers were mixed separately and rapidly and then placed in the sintering apparatus. As in Example 1, a protective grate layer of particles of a size from 8 to 20 mm. thick was placed on the grate. The sintering bed had a total thickness of 35 cm. After igniting the upper layer, air was drawn through the sinter bed under a vacuum of 800 mm. water column by means of a suction fan. Sintering time was 12 minutes, which corresponds to a daily output of 30 tons/m.$^2$ of sinter bed surface. After cooling, the sinter cake was broken up and screened into fractions of greater than 20 mm., 8 to 20 mm., and less than 8 mm. The screened portions were:

| | Percent |
|---|---|
| >20 mm. | 45.7 |
| 8–20 mm. | 24.8 |
| <8 mm. | 29.5 |

The greater portion of the dried and heat hardened particles of the lower layer were under 8 mm. while the particles greater than 8 mm. were composed of solid pieces useful for the blast furnace. Those particles below 8 mm. were useful as recycled material in further operations of the process.

To 51 kg. of fresh ore were added three kg. of coke having the same heat value as in Example 1. This coke had a heat value of 19,000 Kcal. A comparison of the two examples discloses the following advantages of the invention:

A. A preliminary drying apparatus is unnecessary.

B. A special sieve for screening wet sticky materials is not necessary.

C. As compared to Example 1, only 19,000 Kcal. were used according to this invention rather than the 23,900 Kcal. previously required. Therefore, a heat savings of 19 percent is obtained in operating the sintering process of this invention.

Having now described the means by which the objects of the invention are obtained, we claim:

1. A process of preparing wet and sticky raw ores not readily screenable through a less than 30 mm. sieve comprising forming a lower layer of a sinter bed with large lumps of the wet and sticky raw ore, forming an upper layer of the sinter bed with recycled dried ore having particle sizes of 8 mm. or less, sintering the ore in said upper layer and forming sintered particles greater than 8 mm. for use in a furnace, and heating and drying the ore in said lower layer with the sinter heat from the upper layer to form a mixture of dried particles and heat hardened particles screenable to give particles of 8 mm. or less for recycling to said upper layer and heat hardened particles greater than 8 mm. for use without further treatment in a furnace.

2. A process as in claim 1, further comprising mixing recycled dried ore with the raw ore in the lower layer to render the lower layer gas permeable.

3. A process as in claim 2, said lower layer containing from about 10 to 18 percent recycled ore.

4. A process as in claim 3, said upper layer containing dry fractions of raw untreated ore.

5. A process as in claim 4, said dry fractions of ore being in a decreasing amount as the water content of the raw ore increases.

6. A process as in claim 5, further comprising solid fuel mixed with said upper layer, and drawing heated gases through said upper and lower layers.

References Cited in the file of this patent

UNITED STATES PATENTS

| 1,531,695 | Eustis | Mar. 31, 1925 |
| 2,412,104 | Stewart | Dec. 3, 1946 |
| 2,675,223 | Rolfsen | Apr. 13, 1954 |
| 2,772,958 | Beggs | Dec. 4, 1956 |

FOREIGN PATENTS

| 229,608 | Great Britain | Feb. 26, 1925 |